(12) United States Patent
Katsenovich

(10) Patent No.: US 10,286,379 B1
(45) Date of Patent: May 14, 2019

(54) DESICCANT MIXTURE COMPOSITIONS

(71) Applicant: Yelena Katsenovich, Miami, FL (US)

(72) Inventor: Yelena Katsenovich, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 15/797,786

(22) Filed: Oct. 30, 2017

(51) Int. Cl.
*B01J 20/04* (2006.01)
*B01D 53/26* (2006.01)
*B01J 20/02* (2006.01)
*B01J 20/10* (2006.01)

(52) U.S. Cl.
CPC .......... *B01J 20/043* (2013.01); *B01D 53/261* (2013.01); *B01J 20/0248* (2013.01); *B01J 20/103* (2013.01)

(58) Field of Classification Search
CPC .... B01J 20/043; B01J 20/0248; B01J 20/103; B01D 53/261
See application file for complete search history.

(56) References Cited

U.S. PATENT DOCUMENTS

| 5,300,138 A | 4/1994 | Fischer et al. |
| 6,559,096 B1 | 5/2003 | Smith et al. |
| 6,689,197 B2 | 2/2004 | Dick et al. |
| 8,975,208 B2 * | 3/2015 | Long ................. B01J 20/041 208/244 |

\* cited by examiner

*Primary Examiner* — James A Fiorito
(74) *Attorney, Agent, or Firm* — Saliwanchik, Lloyd & Eisenschenk

(57) ABSTRACT

The invention pertains to desiccants within improved adsorption. The desiccants of the invention include silica, aluminum, bicarbonate and calcium. The addition of calcium increases the porosity of the resulting precipitated solid, which increases the adsorption properties. The invention also pertains to methods of preventing moisture damage to a chattel placed in an enclosed environment by placing the desiccant of the invention into the enclosed environment.

13 Claims, 7 Drawing Sheets

DESICCANT MIXTURE COMPOSITIONS

STATEMENT OF GOVERNMENT SUPPORT

This invention was made with government support under Grant No. DE-EM0000598 awarded by the U.S. Department of Energy, Office of Environmental Management. The government has certain rights in the invention.

BACKGROUND

The ability of a solid substance to adsorb water is a function of several factors. Water adsorption occurs when a solid surface is exposed to water or water vapor. The adsorption process is divided into two categories depending on the forces that are involved in the interaction. With physical sorption (i.e., physisorption), water molecules are kept on the surface by weak Van der Waals forces, whereas with chemical adsorption (i.e., chemisorption), water molecules become part of the solid and involve chemical bonding of the water vapor with the solid surface. Thus, physisorption is typically a reversible process and the amount of fluid adsorbed on a surface at equilibrium conditions is dependent on the fluid-solid interactions and the external parameters such as temperature, relative humidity (RH), and vapor pressure. Water molecules adsorb onto the surface of dry solids, forming a monomolecular layer, and as more molecules adhere to the surface, moisture starts transferring into the material via diffusional forces.

Therefore, the total amount of water adsorbed by a solid is usually a sum of the fractions held by different mechanisms. These mechanisms include chemical bonding with the solid; multilayer adsorption; pore or capillarity condensation, responsible for creation of curved interfaces (menisci); and micropore filling. Usually, adsorbed water does not affect a solid until water vapor starts to condensate on the surface at high humidity. Water condensation can trigger a deliquescent process for water-soluble precipitates or components thereof, forming a saturated solution.

The ability of solids to adsorb water vapor can be measured by the sorption or desorption as a function of relative humidity (RH) under constant temperature at equilibrium conditions where sorption or desorption is occurring independent of time. RH is defined through the partial pressure of water vapor as follows:

$$RH = pw/pw^0$$

Where pw is the partial pressure of water vapor over an aqueous solution and $pw^0$ is the partial pressure of water vapor over pure water. The ratio $pw/pw^0$ is referred to as the relative pressure. The activity of water ($a_w$) in aqueous solutions is related to fugacity by the equation:

$$a_w = fw/fw^0$$

Where fw is the fugacity of water vapor over an aqueous solution and $fw^0$ is the fugacity of water vapor over pure water. At ambient temperature and moderate pressure, water vapor is assumed to behave ideally and the fugacities can be replaced by partial pressure:

$$fw/fwo = pw/pw^0$$

Yielding:

$$RH = a_w$$

where RH is commonly expressed as a percentage; thus RH $\% = 100 * a_w$.

At equilibrium conditions, the water activity on a solid surface is equal to the RH of the atmosphere around the solid. One would expect RH to be the same for sorption or desorption measurements. However, one characteristic of the physisorption process is the hysteresis loop associated with capillary condensation. The hysteresis loop is related to the number and size of the pores on the surface of a solid. A hysteresis loop can be irreversible and the amount of fluid adsorbed does not necessarily coincide with increasing or decreasing vapor pressure over a certain interval.

Solids that adsorb water vapor are often used as desiccants in food, pharmaceuticals, electronics, clothing, and other moisture-sensitive products. Solids that have a high adsorption to mass ratio are preferred, as they can require less space and volume to provide the desired desiccant properties.

Currently, dry silica gel is the most commonly used desiccant. Silica-gel produced from sodium silicate is a porous solid. It consists of porous particles with diameters varying between 2-20 nm that account for a surface area of about $2.8 \times 10^7$ m$^2$ per m$^3$ of silica gel. Due to these properties, the silica-gel can adsorb water vapor. Desiccants with better moisture absorbing capacity than silica-gel are desirable.

BRIEF SUMMARY

The subject invention provides a multi-component desiccant composition that provides better moisture absorption capacities compared to conventional desiccants, particularly, pure silica gel. In certain embodiments, the desiccants of the invention comprise silica (Silicon dioxide, $SiO_2$), aluminium (Al), bicarbonate, and calcium (Ca).

In preferred embodiments, the desiccant comprises 50 to 150 mM silica, 1 to 10 mM Al, 2 to 50 mM bicarbonate, and 2 to 20 mM Ca. Inclusion of $Ca^{2+}$ in the desiccant compositions of the invention causes precipitation of a $CaCO_3$ (e.g., calcite) and coagulation of silica. The resulting desiccant compositions comprise calcium carbonate, silicates, and aluminosilicate, which provide a highly porous structure. The porosity of the precipitate provides the desiccant compositions of the invention a greater capacity to adsorb water vapor compared to pure silicate.

BRIEF DESCRIPTION OF DRAWINGS

FIG. 4A shows samples prepared with 3 mM bicarbonate and 0 mM or 5 mM of Ca. FIG. 4B shows samples prepared with 3 mM bicarbonate and 10 mM or 15 mM of Ca. FIG. 4C shows samples prepared with 50 mM bicarbonate and 0 mM or 5 mM Ca.

FIG. 4D shows samples prepared with 50 mM bicarbonate and 10 mM or 15 mM of Ca.

FIG. 5A shows samples prepared with 3 mM bicarbonate. FIG. 5B shows samples prepared with 50 mM bicarbonate.

DETAILED DESCRIPTION

Certain embodiments of the invention provide improved desiccants. More specifically, the subject invention provides desiccants having properties superior to conventional desiccants, such as silica-gel.

Figure 1A:
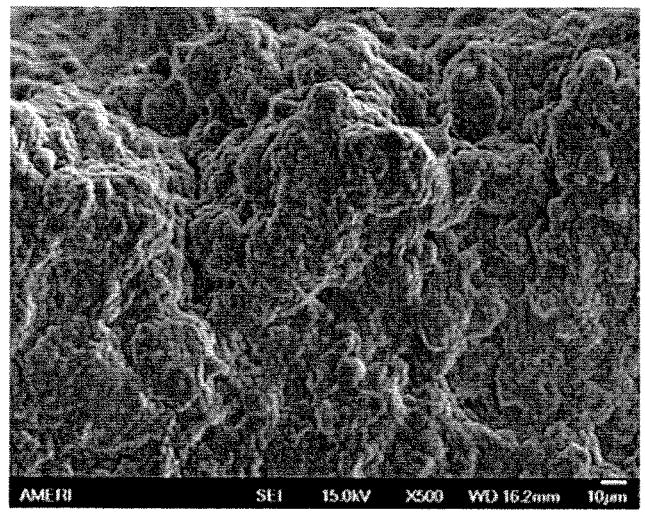
FIGS. 1A-1C are scanning electron microscope (SEM) images of desiccant compositions comprising 100 mM silica, 5 mM Al, and 3 mM bicarbonate, and further containing 0 mM Ca (FIG. 1A), 10 mM Ca (FIG. 1B), or 15 mM Ca (FIG. 1C).
Figure 1B:
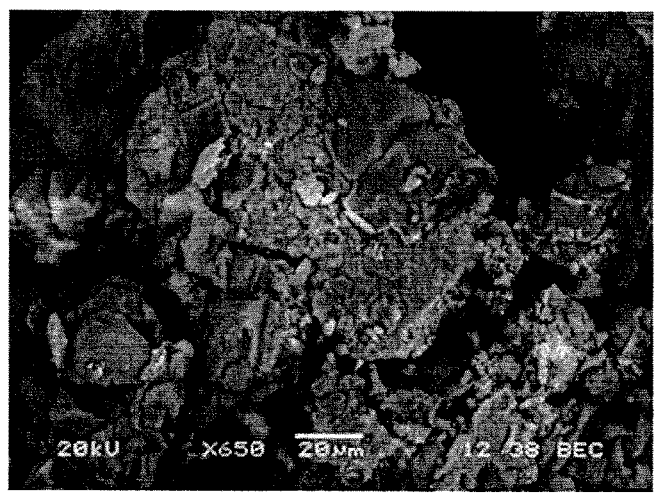
Figure 1C:
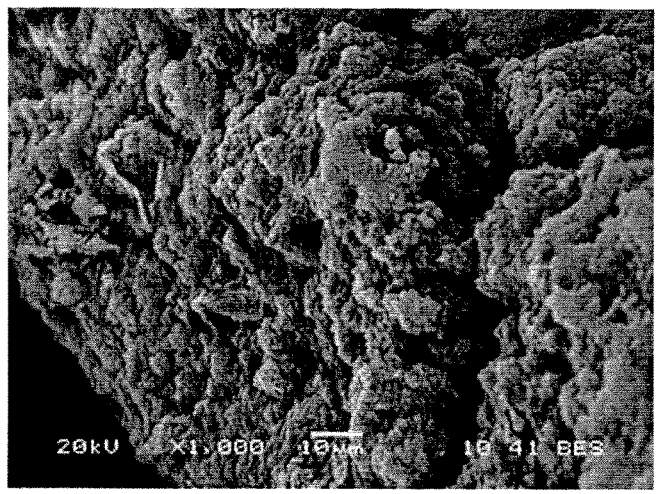
Figure 2A:
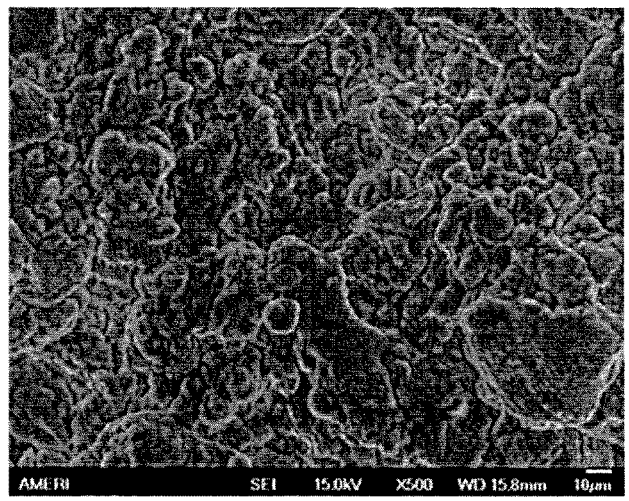
FIGS. 2A-2B are scanning electron microscope (SEM) images of desiccant compositions comprising 100 mM silica, 5 mM Al, and 50 mM bicarbonate, and further comprising 0 mM Ca and 15 mM Ca. The image in FIG. 1A, having 0 mM Ca looks similar to the 0 mM Ca samples prepared with 3 mM bicarbonate.
Figure 2B:
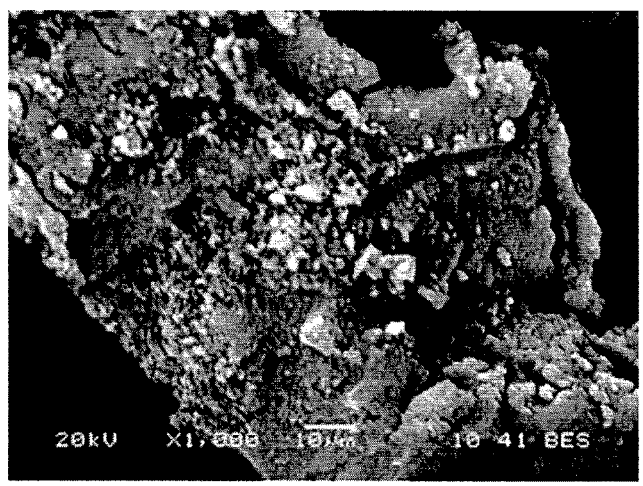
Figure 3:
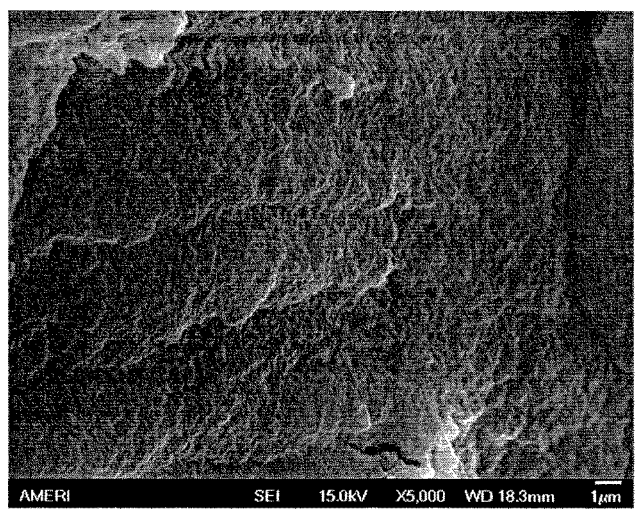
FIG. 3 is a scanning electron microscope (SEM) image of desiccant composition comprising 100 mM silica, 5 mM Al, and 0 mM bicarbonate.
Figure 4A:
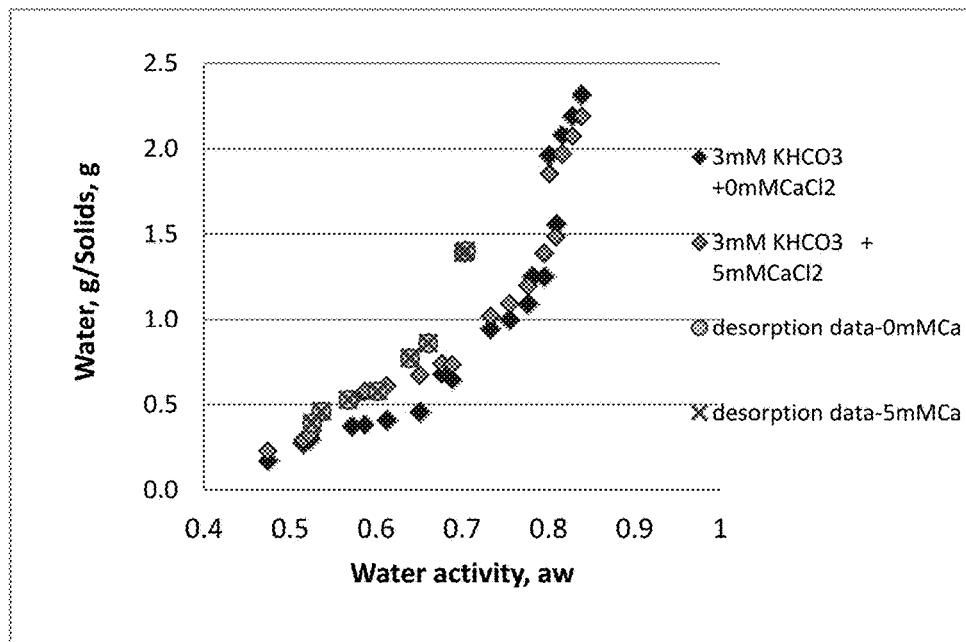
FIGS. 4A-4D are graphs showing water adsorption isotherms for U-bearing solids.
Figure 4B:
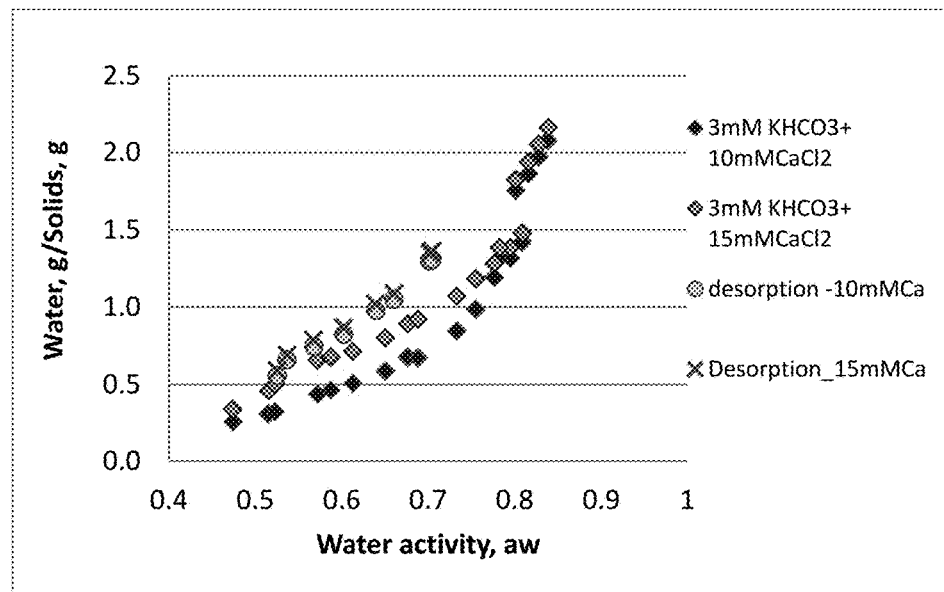
Figure 4C:
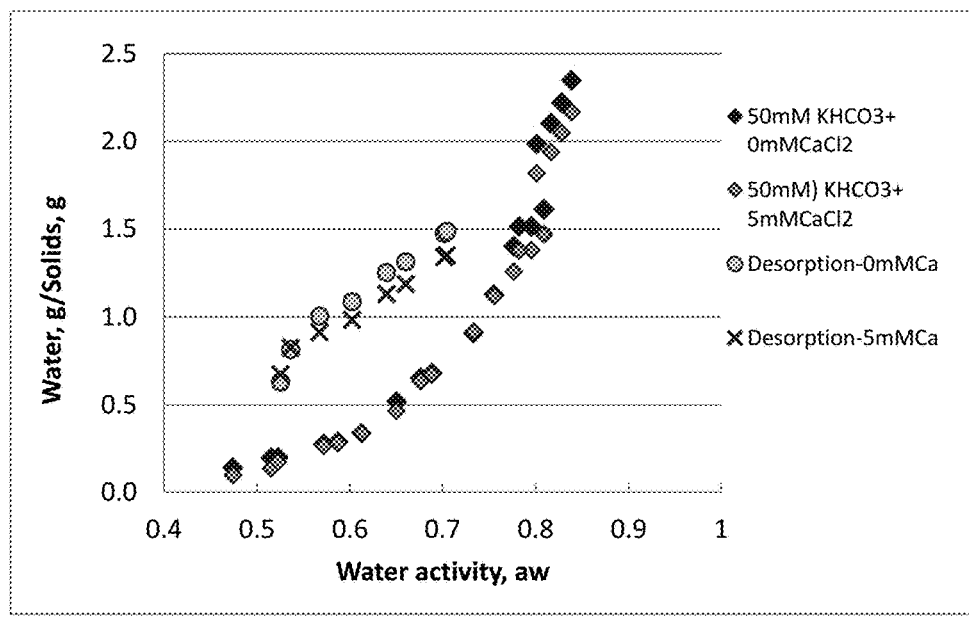
Figure 4D:
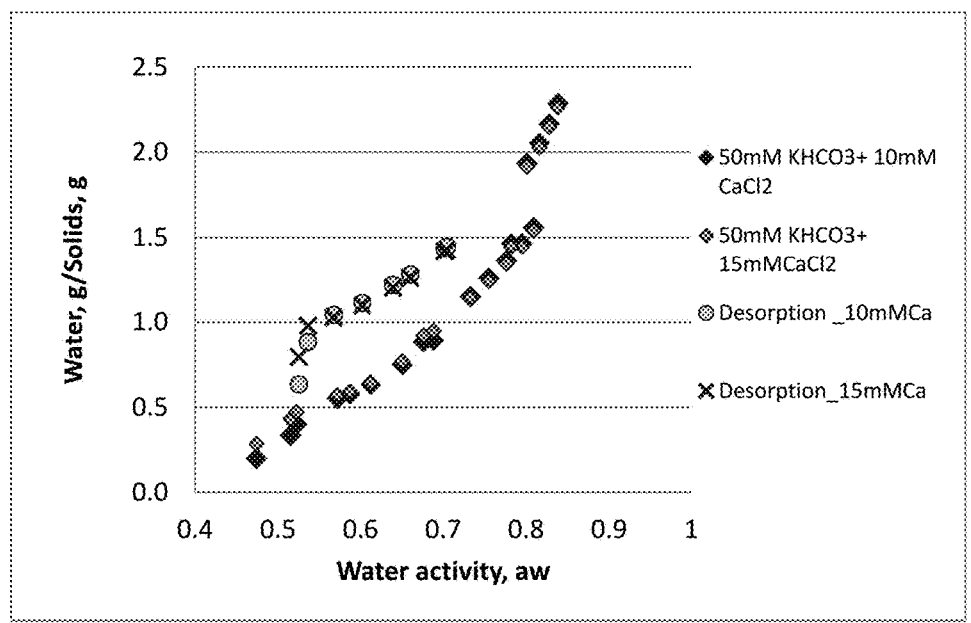

In some embodiments, the desiccants of the invention comprise silica, Al, bicarbonate, and Ca. The inclusion of Ca as part of the desiccant compositions significantly increases the porosity of the resulting desiccant. The porosity of the desiccants of the subject invention result in increased adsorption and decreased desorption of water. FIGS. 1A, 1B, and 1C illustrate examples of desiccants of the invention and the resulting surface porosity. FIG. 1A shows that where the precipitate solution was prepared without calcium, the surface porosity is similar to that of the silica gel precipitate shown in FIG. 3. FIGS. 1B and 1C show desiccants prepared with Ca, in addition to bicarbonate. These Figures how that the porosity is greater upon inclusion of Ca, which provides increased the adsorption capabilities. The desiccants of the invention are solid in nature and are not water soluble. Therefore, the desiccants of the invention maintain their structural integrity even after absorbing water.

In certain embodiments, the desiccants of the invention comprise 50 to 150 mM silica, 1 to 10 mM Al, 2 to 50 mM bicarbonate, and 2 to 20 mM Ca.

In particular embodiments, the desiccants of the invention contain 50 to 150 mM, 60 to 140 mM, 70 to 130 mM, 80 to 120 mM, 90 to 110 mM, or about 100 mM of silica.

In specific embodiments, the desiccants of the invention contain 1 to 10 mM, 2 to 9 mM, 3 to 8 mM, 4 to 6 mM, or about 5 mM Al.

In some embodiments, the desiccants of the invention contain 2 to 50 mM, 5 to 45 mM, 10 to 40 mM, 15 to 35 mM, 20 to 30 mM, or about 25 mM of bicarbonate. Any salt of bicarbonate can be used. Preferred bicarbonate salts include potassium bicarbonate or sodium bicarbonate. Additional salts of bicarbonate are well known to a skilled artisan and such embodiments are within the purview of the invention.

In further embodiments, the desiccants of the invention contain 2 to 20 mM, 4 to 18 mM, 6 to 16 mM, 8 to 14 mM, 10 to 12 mM, or about 10 mM Ca.

In particularly preferred embodiments, the desiccants of the invention comprise:
  i) about 100 mM silica, about 5 mM Al, about 3 mM bicarbonate, and about 5 mM Ca,
  ii) about 100 mM silica, about 5 mM Al, about 3 mM bicarbonate, and about 10 mM Ca,
  iii) about 100 mM silica, about 5 mM Al, about 3 mM bicarbonate, and about 15 mM Ca,
  iv) about 100 mM silica, about 5 mM Al, about 50 mM bicarbonate, and about 5 mM Ca,
  v) about 100 mM silica, about 5 mM Al, about 50 mM bicarbonate, and about 10 mM Ca,
  vi) about 100 mM silica, about 5 mM Al, about 50 mM bicarbonate, and about 15 mM Ca.

Desiccants are typically used to prevent damage caused by moisture, such as moisture induced corrosion of metals, rust, mold, mildew, fungus, swelling, and other undesirable effects. Desiccants are used to protect chattels from damage caused by the moisture trapped in an enclosed space, such as packaging or small enclosures. For example, the stability of many pharmaceutical formulations and food products is often determined by the moisture conditions of their packaging. In addition, desiccants are also commonly used to protect chattels against moisture damage in shipping containers.

Accordingly, certain embodiments of the invention provide methods of preventing moisture damage to a chattel placed in an enclosed environment, comprising placing a desiccant into the enclosed environment, the desiccant comprising silica, Al, bicarbonate, and Ca. Any of the specific desiccants described above can be used in the subject methods of preventing moisture damage to chattels. Typically, desiccants are packaged in moisture permeable sachets and placed in the enclosed environments.

In preferred embodiments, the enclosed environment is a packaging containing chattels that require protection from moisture damage. Such chattels include a perishable biological material, such as tissue specimen; equipment made from metals prone to moisture induced corrosion, such as surgical tools; perishable pharmaceutical agents, such as biologicals or hygroscopic small molecule drugs; dry food products, such as chips; and electronic equipment. Additional examples of chattels and enclosed environments where the methods and desiccants of the instant invention can be used are known in the art or can be readily envisioned by a skilled artisan. Such embodiments are within the purview of the invention.

As used herein, the singular forms "a", "an" and "the" are intended to include the plural forms as well, unless the context clearly indicates otherwise. Further, to the extent that the terms "including", "includes", "having", "has", "with", or variants thereof are used in either the detailed description and/or the claims, such terms are intended to be inclusive in a manner similar to the term "comprising."

The phrases "consisting essentially of" or "consists essentially of" indicate that the claim encompasses embodiments containing the specified materials or steps and those that do not materially affect the basic and novel characteristic(s) of the claim.

The term "about" means within an acceptable error range for the particular value as determined by one of ordinary skill in the art, which will depend in part on how the value is measured or determined, i.e., the limitations of the measurement system. Where particular values are described in the application and claims, unless otherwise stated the term "about" meaning within an acceptable error range for the particular value should be assumed. In the context of compositions containing amounts of ingredients where the term "about" is used, these compositions contain the stated amount of the ingredient with a variation (error range) of 0-10% around the value (X±10%).

In the present disclosure, ranges are stated in shorthand, to avoid having to set out at length and describe each and every value within the range. Any appropriate value within the range can be selected, where appropriate, as the upper value, lower value, or the terminus of the range. For example, a range of 0.1-1.0 represents the terminal values of 0.1 and 1.0, as well as the intermediate values of 0.2, 0.3, 0.4, 0.5, 0.6, 0.7, 0.8, 0.9, and all intermediate ranges encompassed within 0.1-1.0, such as 0.2-0.5, 0.2-0.8, and 0.7-1.0.

When ranges are used herein, combinations and subcombinations of ranges (e.g., subranges within the disclosed range), specific embodiments therein are intended to be explicitly included.

As used herein, the term "silica" as silica refers to amorphous, sol, and gel forms of an oxide of silicon with the chemical formula $SiO_2$. The term "silica" includes monomeric silica [$Si(OH)_4$], meta-silicic acid ($H_2SiO_3$), and oligomeric silica, such as di-silicic acid ($H_2Si_2O_5$), tri-silicic acid ($H_2Si_3O_7$), pentahydro-silicic ($H_{10}Si_2O_9$), and pyro-silicic acid ($H_6Si_2O_7$). Silicic acids, polysilicic acids, or salts thereof are also envisioned. Concentrated silica sols and gels are also included. Additional amorphous forms of silica are known to a person skilled in the art and such embodiments are within the purview of the invention. Use of crystalline or solid-phases bearing silica, such as quartz, is not envisioned.

As used herein, the term "bicarbonate" (IUPAC nomenclature: hydrogencarbonate) is an intermediate form in the deprotonation of carbonic acid. Bicarbonate is a polyatomic anion with the chemical formula $HCO_3^-$. The term "bicarbonate" includes a salt of bicarbonate anion. Such salts include sodium bicarbonate, potassium bicarbonate, and ammonium bicarbonate, carbonic acid. Additional bicarbonates are known to a person skilled in the art and such embodiments are within the purview of the invention.

As used herein, the term "aluminium or Al" refers to an appropriate compound containing Al. Therefore, the term "aluminium" refers to includes compounds of Al, such as aluminium halide (fluoride, iodide, chloride, or bromide), aluminium nitrate, aluminium phosphate, aluminium sulfate, and aluminium perchlorate. Aluminium containing compounds can also be hydrated. Additional compounds containing aluminium are known to a person skilled in the art and such embodiments are within the purview of the invention. Use of pure elemental aluminum, aluminum alloy, or any aluminum composites is not envisioned.

As used herein, the term "calcium or Ca" refers to elemental Ca or an appropriate compound containing Ca. Therefore, the term "calcium" includes compounds of Ca, such as calcium halide (fluoride, iodide, chloride, or bromide), calcium nitrate, and calcium perchlorate. Calcium containing compounds can also be hydrated. Additional compounds containing calcium are known to a person skilled in the art and such embodiments are within the purview of the invention.

All patents, patent applications, provisional applications, and publications referred to or cited herein are incorporated by reference in their entirety, including all figures and tables, to the extent they are not inconsistent with the explicit teachings of this specification.

Following are examples which illustrate procedures for practicing the invention. These examples should not be construed as limiting. All percentages are by weight and all solvent mixture proportions are by volume unless otherwise noted.

Example 1—Preparation of Desiccants

Desiccants were prepared using two different bicarbonate concentrations (3 mM and 50 mM) and four different Ca concentrations (0 mM, 5 mM, 10 mM and 15 mM). The compositions of the desiccants are presented in Table 1. Four desiccants were prepared using 3 mM bicarbonate and 0 to 15 mM of Ca and four desiccants were prepared using 50 mM bicarbonate and 0 to 15 mM of Ca. Each desiccant was prepared in a tared crucible and dried at 40° C. until attaining a constant weight.

TABLE 1

Concentrations of desiccant constituents in 50 mL of desiccants

| Stock Solution | Salts Used | Molecular Weight (g/mol) | Stock Solution Concentration (mM) | Amount to Prepare 50 mL (g) | Target Concentrations in Samples (mM) |
|---|---|---|---|---|---|
| Bicarbonate | Potassium bicarbonate | 100.114 | 400 | 2.002 | 3, 50 |
| Metasilicate | $Na_2SiO_3 \cdot 9H_2O$ | 284.196 | 422.24 | 5.998 | 100 |
| Aluminum | $Al(NO_3)_3 \cdot 9H_2O$ | 375.129 | 50 | 0.938 | 5 |
| Calcium | $CaCl_2 \cdot H_2O$ | 219.08 | 2500 | 27.385 | 0, 5, 10, 15 |

The initial weights of the desiccants and solutes are presented in Table 2.

TABLE 2

Initial desiccant weights

| Sample number | Standard Sample | Solute Initial Weight (g) | Solute Content (moles) | Ratio of Elements in the Composition |
|---|---|---|---|---|
| 1 | 100 mM Silica, 5 mM Al, 3 mM bicarbonate, 0 mM Ca | 0.18931 | 0.00024 | Silica:Al:bicarbonate: Ca = 33:1.7:1:0 |
| 2 | 100 mM Silica, 5 mM Al, 3 mM bicarbonate, 5 mM Ca | 0.19113 | 0.00024 | Silica:Al:bicarbonate: Ca = 33:1.7:1:1.7 |
| 3 | 100 mM Silica, 5 mM Al, 3 mM bicarbonate, 10 mM Ca | 0.20101 | 0.00024 | Silica:Al:bicarbonate: Ca = 33:1.7:1:3.4 |

TABLE 2-continued

Initial desiccant weights

| Sample number | Standard Sample | Solute Initial Weight (g) | Solute Content (moles) | Ratio of Elements in the Composition |
|---|---|---|---|---|
| 4 | 100 mM Silica, 5 mM Al, 3 mM bicarbonate, 15 mM Ca | 0.19627 | 0.00024 | Silica:Al:bicarbonate:Ca = 33:1.7:1:5 |
| 5 | 100 mM Silica, 5 mM Al, 50 mM bicarbonate, 0 mM Ca | 0.22623 | 0.00030 | Silica:Al:bicarbonate:Ca = 20:1:10:0 |
| 6 | 100 mM Silica, 5 mM Al, 50 mM bicarbonate, 5 mM Ca | 0.23957 | 0.00030 | Silica:Al:bicarbonate:Ca = 20:1:10:1 |
| 7 | 100 mM Silica, 5 mM Al, 50 mM bicarbonate, 10 mM Ca | 0.23168 | 0.00030 | Silica:Al:bicarbonate:Ca = 20:1:10:2 |
| 8 | 100 mM Silica, 5 mM Al, 50 mM bicarbonate, 15 mM Ca | 0.23467 | 0.00031 | Silica:Al:bicarbonate:Ca = 20:1:10:3 |

During the preparation of desiccants, monomeric silica, $Si(OH)_4$, reacts with $Al_3^+$ ions to form aluminum silicate, which precipitates. Accordingly, $Si(OH)_{4n}$ surfaces exposed to solutions containing aluminum form aluminosilicate surface complexes by the following reaction:

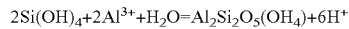

$$2Si(OH)_4 + 2Al^{3+} + H_2O = Al_2Si_2O_5(OH_4) + 6H^+$$

The addition of $Ca^{2+}$ ions result in the precipitation of $CaCO_3$ (e.g. calcite) and coagulation of silica. Resulting desiccants composed of calcium carbonate, silicates and aluminosilicate has a highly porous structure that a greater capacity to adsorb water vapor compared to pure silicate desiccant.

Figure 6:
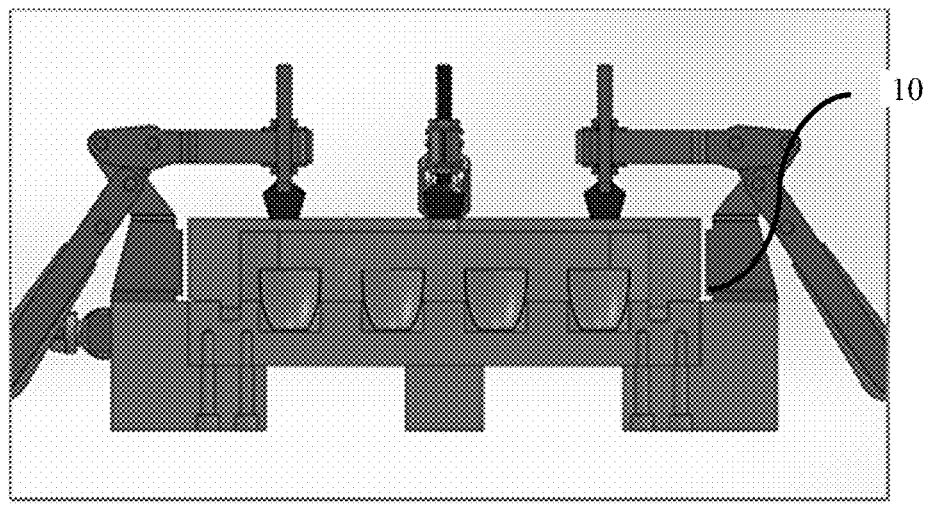
FIG. 6 is a schematic of the full assembly of an isopiestic chamber with crucibles inside.
Figure 7A:
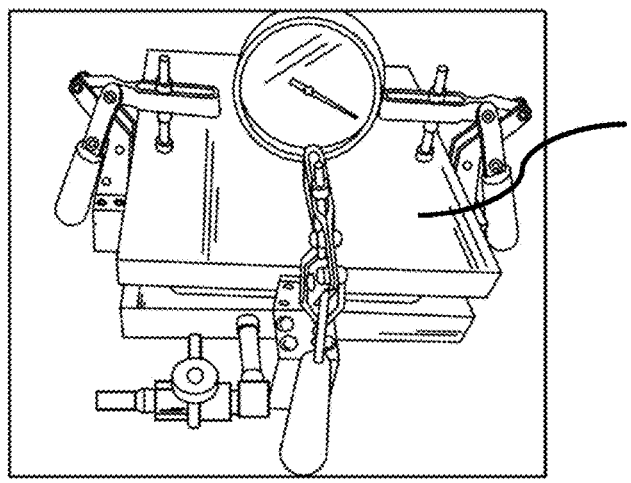
FIGS. 7A-7B are photographs of assembled isopiestic chambers and the isopiestic chambers with the lid removed, respectively. These chambers were used for testing the desiccant compositions of the subject invention.
Figure 7B:
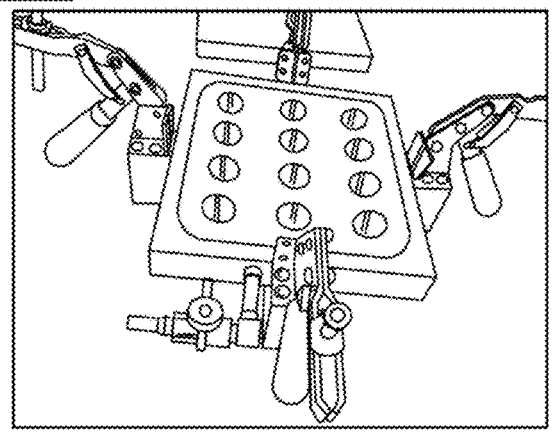
Figures 8A, 8B:
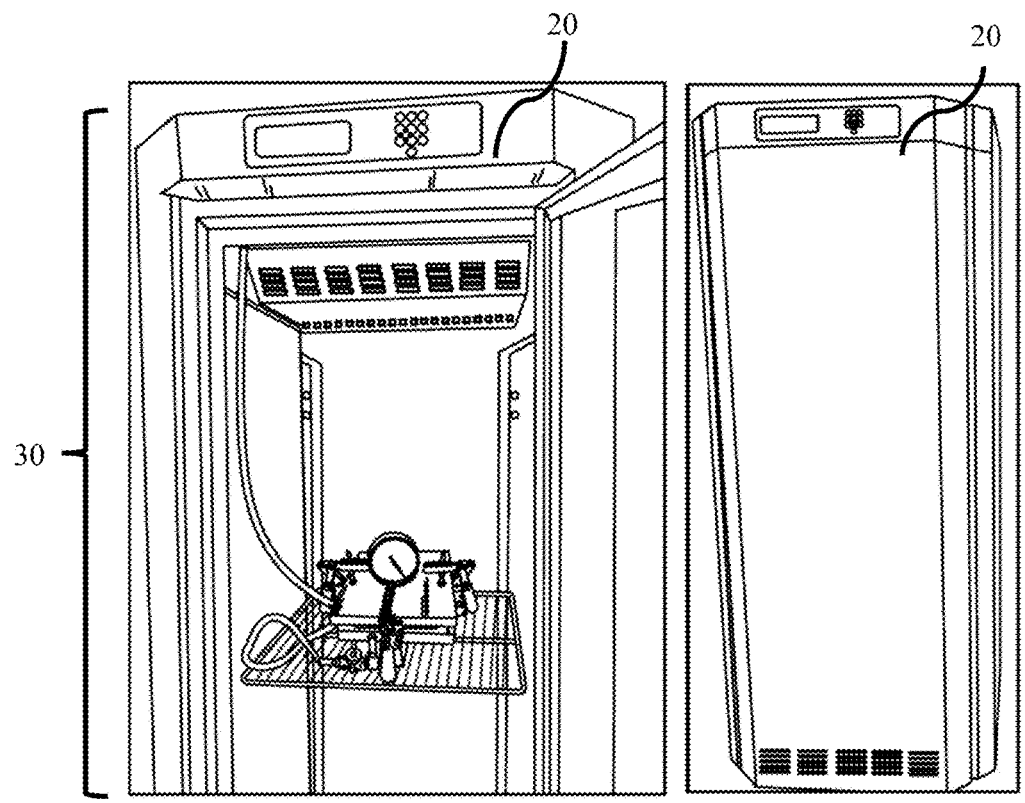
FIG. 8A-8B are photographs of the isopiestic chamber in FIG. 7A within an environmental chamber.

Example 2—Measurement of Water Adsorption Capability of Desiccants of the Subject Invention and Comparison with Silica Gel Water adsorption capacity of the dried desiccants of the subject invention was quantified at a constant temperature. The techniques for measuring isopiestic molalities of aqueous solutions and features can also be used to quantify water adsorption. The basic method includes using an isopiestic chamber 10 (FIG. 6) to obtain isothermal equilibration of samples of known masses and known initial concentrations through a common vapor phase. The isopiestic chamber used for the desiccants is shown in FIGS. 6 and 7A. FIG. 7B shows the isopiestic chamber with the cover removed to reveal the depressions for the crucibles therein. The isopiestic chamber was placed in an environmental chamber 20 (FIGS. 8A and 8B), which included a vacuum pump, as shown, in FIGS. 8A and 8B. The isopiestic chamber in combination with the environmental chamber forms a closed system 30 (FIG. 8A).

In the isopiestic chamber 10, the solvent is distilled isothermally between the crucibles until the solution in each crucible reaches the same chemical potential. All of the solutions at equal vapor pressure or isopiestic equilibrium have the same solvent activities. These conditions can be rewritten as $\ln a_g = \ln a_{ref}$.

Because silica is a major component of the instant desiccants, water retention capacity of these desiccants was compared to that of silica gel. For making the comparison, 10 mL samples of 100 mM sodium silicate were dried to achieve a constant weight and then placed in the isopiestic chamber. The results of water retaining capacities obtained for pure silica gel samples were compared with those of the desiccants described in Example 1. A solution of calcium chloride was used as a standard to evaluate the water activity of the samples. The apparatus was sealed, degassed and maintained at 25° C. in the environmental chamber.

After the closed system 30 reached equilibrium, the isopiestic chamber 10 was removed and opened every 2-3 weeks and the samples were weighed. The samples were held in 15-mL nickel cups. To avoid evaporation losses, tightly fitted light nickel lids were immediately placed over the cups when the apparatus was opened. Then, the crucibles with lids weighed. Mettler Toledo analytical balances XS205DU with a precision of no less than $1 \times 10^{-5}$ g were used for weighing the crucible cups covered with lids. The measurements obtained were used to calculate the water adsorption and water activity values. The percent of water loss during the weighing process was estimated to be in the range of 3.5-5%. After the samples were weighed, about 0.4 mL of degassed DIW was distributed between the standards and the samples and the chamber was closed again; the air was evacuated until the pressure reached around 4.5 kPa.

The direct weighing method can provide several advantages. The mass of the sample is determined in comparison with standard weights. The results are not prone to errors in pressure measurements. With the direct weighing method, all of the points on an isotherm are measured independently. Thus, the errors for data points obtained earlier do not affect the following points. This allows for monitoring the weight of the sample over long time periods.

Example 3—Comparison of Adsorption Properties of Instant Desiccants and Silica Gel A desorption isotherm was obtained by progressively decreasing the water activity or relative pressure in the isopiestic chamber 10 while monitoring the equilibrium amount of moisture absorbed at each relative pressure. This was accomplished by the addition in the isopiestic chamber of another crucible with a few drops of concentrated $H_2SO_4$ that created an excellent "sink" for water vapor. Water sorption-desorption isotherms thus obtained for uranium-bearing precipitates can provide insight on the nature of precipitate-water interactions. This information is obtained from the amount of moisture absorbed at certain humidities and, in addition, suggests whether the process is reversible. This can be found from the hysteresis between sorption and desorption and from the shape of the hysteresis loop.

The amount of vapor adsorbed by the precipitated solids is proportional to the mass of the sample and depends on the relative pressure inside the chamber and temperature. Since the experiments were conducted at a constant temperature of 25° C., temperature variations were not considered. The conditions for each isotherm (g of water/g of solids) were calculated by dividing the amount of adsorbed moisture (g) by the amount of dry precipitate samples (g).

FIGS. 4A, 4B, 4C, and 4D show that the shapes of the adsorption isotherms reflect a Type II sorption isotherm curve according to the recommended classification. This type of isotherm is characterized by monolayer-multilayer sorption on the nonporous or macroporous surface of a precipitate. This isotherm is further characterized by a hysteresis loop that shows the difference between adsorption and desorption isotherms. A hysteresis loop is commonly associated with a capillary condensation taking place in mesopores. The initial part of the Type II isotherm is characterized by a linear increase in water retention until reaching a formation of a well-defined monolayer at which monolayer coverage is complete and multilayer adsorption begins. At high water activities, a steep upward increase of water retention is noted due to vapor condensation. Therefore, at high humidity, solid water-soluble components at the surface of a desiccant start to dissolve in adsorbed water vapor forming a saturated solution. This would eventually lead to the deliquescence of the desiccant and the formation of a liquid phase.

Figure 5A:
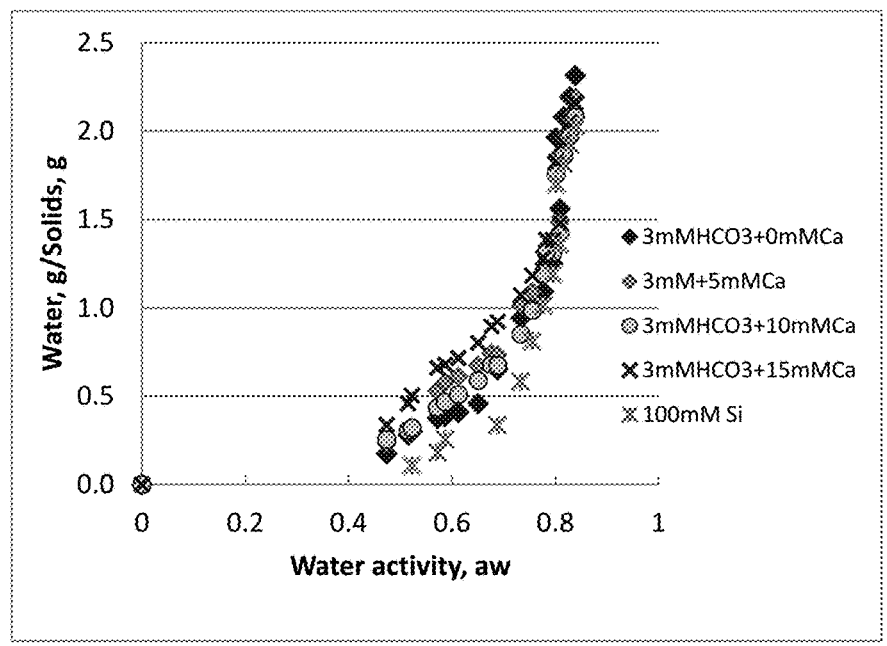
FIGS. 5A-5B are graphs that illustrate the adsorption isotherms of Uranium-bearing solids.
Figure 5B:
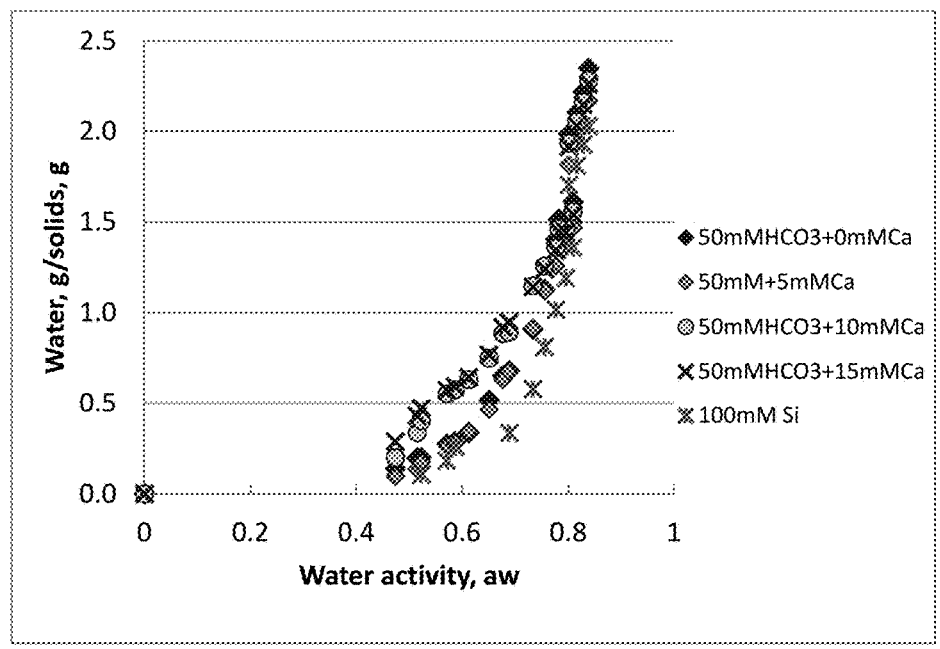

All experimental data obtained were grouped to present isotherms for the subject desiccants composed of 3 mM bicarbonate and 50 mM bicarbonate, each prepared with 0 mM, 5 mM, 10 mM, and 15 mM of Ca. The results are shown in FIGS. 5A and 5B, respectively. Each figure also includes results for the desiccants prepared using pure 100 mM sodium silicate for comparison.

The amount of water adsorbed by the subject desiccants at $a_w$=0.67 ranged between 0.63-0.77 g water/g desiccant. The water retention capability was generally greater for the subject desiccants compared to dry silicate gel. In addition, the desiccants prepared with higher Ca concentrations exhibited higher abilities for water retention.

Silica is a major component of the subject desiccants, which are mainly amorphous upon formation. For example, silica-gel produced from sodium silicate is considered to be a porous solid. It consists of porous particles with diameters varying between 2-20 nm that account for a surface area of about $2.8 \times 10^7$ $m^2$ per $m^3$ of silica gel. Due to these properties, the silica-gel has a great capacity to adsorb water vapor. The amount of water adsorbed on the silica samples at $a_w$=0.67 averaged up to 58% of the dry mass of the silica gel samples, which is higher than observed by (Ng et al. (2001)).

Dried samples prepared from silica gel were examined under scanning electron microscope (SEM) showing nano size clusters consisting of massive dense amorphous silica (FIG. 6). The recovered solids were allowed to dry in preparation for SEM analysis and small specimens were taken from the solid precipitates and mounted to aluminum studs covered with double-sided carbon tape. The SEM system used was a JOEL-5910-LV with acceleration potentials ranging from 10 to 20 kV. The specimens were coated with gold and palladium to enhance conductivity.

The surface properties of amorphous silica in many cases depend on the presence of hydroxyl silanol groups, ≡Si—OH, which are formed on the surface by the condensation polymerization of $Si(OH)_4$ and as a result of rehydroxylation of dehydroxylated silica when it is treated with water or aqueous solutions. Supersaturated solutions of monomeric $Si(OH)_4$ are formed when an aqueous solution of soluble silicate is acidified.

This also leads to the formation of colloidal particles of silica, which are porous with an extensive internal surface covered with ≡Si—OH groups. The sufficient concentration of silanol groups makes such a surface hydrophilic. The $H_2O$ molecule always interacts with the hydroxyl groups through H-bonding. After drying some of the silanol groups remain on the surface.

Measurements of desorption hysteresis loops down to low water activity suggested that adsorption and desorption isotherms did not coincide for any of the subject desiccants and the desorption branch is steeper than the adsorption (4A-4D). Initial measurements exhibited hysteresis loop between sorption and desorption isotherms, suggesting that the subject desiccants are most likely porous in nature and are able to absorb water via capillary condensation. In addition, subject desiccants prepared with 3 mM and 50 mM bicarbonate concentrations and also containing Ca exhibited broader hysteresis loop formed by adsorption/desorption isotherms compared to Ca-free samples containing the same bicarbonate concentrations (FIG. 4). The scanning electron microscope (SEM) was used to reveal morphological characteristics of the surfaces of the subject desiccants (FIGS. 1A, 1B, 1C, 2A, and 2B). SEM images revealed that samples that included Ca are more porous in nature that could lead to greater adsorption capacity of water (FIGS. 1A-C and 2A and 2B).

The invention claimed is:

1. A desiccant comprising: about 100 mM silica, about 5 mM Al, about 3 mM to about 50 mM bicarbonate, and about 5 mM to about 15 mM Ca.

2. The desiccant according to claim 1, comprising: about 100 mM silica, about 5 mM Al, about 3 mM bicarbonate, and about 5 mM Ca.

3. The desiccant according to claim 1, comprising: about 100 mM silica, about 5 mM Al, about 3 mM bicarbonate, and about 10 mM Ca.

4. The desiccant according to claim 1, comprising: about 100 mM silica, about 5 mM Al, about 50 mM bicarbonate, and about 5 mM Ca.

5. The desiccant according to claim 1, comprising: about 100 mM silica, about 5 mM Al, about 50 mM bicarbonate, and about 10 mM Ca.

6. The desiccant of claim 1, comprising: about 100 mM silica, about 5 mM Al, about 3 mM bicarbonate, and about 15 mM Ca.

7. The desiccant of claim 1, comprising: about 100 mM silica, about 5 mM Al, about 50 mM bicarbonate, and about 15 mM Ca.

8. A method of preventing moisture damage to a chattel placed in an enclosed environment, comprising placing into the enclosed environment a desiccant comprising about 100 mM silica, 5 mM Al, about 3 mM silica, about 5 mM Al, about 50 mM bicarbonate, and about 5 mM to about 15 mM Ca.

9. The method according to claim 8, wherein the desiccant comprises 100 mM silica, 5 mM Al, 50 mM bicarbonate, and 15 mM Ca.

10. The method according to claim 8, wherein the desiccant comprises about 100 mM silica, about 5 mM Al, about 3 mM bicarbonate, and about 10 mM Ca.

11. The method according to claim 8, wherein the desiccant comprises: about 100 mM silica; about 5 mM Al; about 3 mM bicarbonate; and about 5 mM or 15 mM Ca.

12. The method according to claim 8, wherein the desiccant comprises: about 100 mM silica; about 5 mM Al; about 50 mM bicarbonate; and about 5 mM or 10 mM Ca.

13. The method according to claim 8, wherein the enclosed environment is a packaging for the chattel and the chattel is a biological material, an equipment made from a metal prone to moisture induced corrosion, a pharmaceutical agent, a dry food product, an electronic equipment, or a clothing product.

\* \* \* \* \*